US008234710B2

(12) United States Patent
Wenzinger et al.

(10) Patent No.: US 8,234,710 B2
(45) Date of Patent: Jul. 31, 2012

(54) MALWARE AUTOMATED REMOVAL SYSTEM AND METHOD USING A DIAGNOSTIC OPERATING SYSTEM

(75) Inventors: Michael Wenzinger, Savage, MN (US); Michael Sherwood, Eden Prairie, MN (US)

(73) Assignee: BB4 Solutions, Inc., Richfield, MN (US)

( * ) Notice: Subject to any disclaimer, the term of this patent is extended or adjusted under 35 U.S.C. 154(b) by 103 days.

(21) Appl. No.: 12/380,681

(22) Filed: Mar. 3, 2009

(65) Prior Publication Data

US 2009/0217258 A1 Aug. 27, 2009

Related U.S. Application Data

(63) Continuation-in-part of application No. 11/825,168, filed on Jul. 5, 2007.

(60) Provisional application No. 60/818,809, filed on Jul. 5, 2006, provisional application No. 61/134,673, filed on Jul. 11, 2008.

(51) Int. Cl.
*G06F 21/00* (2006.01)

(52) U.S. Cl. ................................. 726/24; 726/22; 713/2

(58) Field of Classification Search ........ 713/2; 726/22, 726/24
See application file for complete search history.

(56) References Cited

U.S. PATENT DOCUMENTS

| | | | |
|---|---|---|---|
| 5,559,960 A * | 9/1996 | Lettvin | 726/24 |
| 6,170,055 B1 * | 1/2001 | Meyer et al. | 713/2 |
| 6,212,635 B1 * | 4/2001 | Reardon | 713/165 |
| 6,230,285 B1 * | 5/2001 | Sadowsky et al. | 714/14 |
| 6,279,109 B1 * | 8/2001 | Brundridge | 713/2 |
| 6,532,535 B1 * | 3/2003 | Maffezzoni et al. | 713/1 |
| 6,993,649 B2 * | 1/2006 | Hensley | 713/2 |
| 7,096,368 B2 * | 8/2006 | Kouznetsov et al. | 713/189 |
| 7,137,034 B2 * | 11/2006 | Largman et al. | 714/23 |
| 7,222,143 B2 * | 5/2007 | Childs et al. | 1/1 |
| 7,284,043 B2 * | 10/2007 | Feinleib et al. | 709/220 |
| 7,370,188 B2 * | 5/2008 | Rothman et al. | 713/2 |
| 7,448,034 B2 * | 11/2008 | Anderson et al. | 717/176 |
| 7,480,793 B1 * | 1/2009 | Marsh | 713/2 |
| 7,512,584 B2 * | 3/2009 | Keith, Jr. | 706/60 |
| 7,549,055 B2 * | 6/2009 | Zimmer et al. | 713/188 |
| 7,591,018 B1 * | 9/2009 | Lee | 726/24 |
| 7,657,941 B1 * | 2/2010 | Zaitsev | 726/24 |
| 7,680,957 B1 * | 3/2010 | Ketterhagen et al. | 709/246 |
| 7,734,945 B1 * | 6/2010 | Levidow et al. | 714/3 |
| 7,735,100 B1 * | 6/2010 | Sallam | 719/330 |
| 7,752,182 B1 * | 7/2010 | Arnold et al. | 707/692 |

(Continued)

*Primary Examiner* — Edan Orgad
*Assistant Examiner* — James Turchen
(74) *Attorney, Agent, or Firm* — Beck & Tysver PLLC

(57) ABSTRACT

The present invention automates the operation of multiple malware removal software products using a computerized system that systematically operates the multiple selected software products. These products are executed within a customized Diagnostic Operating System, which is different from the Normal Operating System in which the computer normally operates. Thus, any malware that may be attached to any of the programs, shells, drivers, services, or data files associated with the Normal Operating System cannot corrupt the malware removal process performed under the Diagnostic Operating System. Preferably, the Diagnostic Operating System is accessed from a read-only device prepared on a secure computer separate from the computer that is the target of the malware removal process, and the Diagnostic Operating System executes in a read-only environment. Because many malware removal products rely upon the environment provided by the Normal Operating System, the Diagnostic Operating System must provide redirection to ensure such products perform as expected. Event-triggered redirection of environment variables may be done by either injection of values, or by interception of name/key invocations.

34 Claims, 12 Drawing Sheets

U.S. PATENT DOCUMENTS

| | | | |
|---|---|---|---|
| 7,950,008 B2 * | 5/2011 | Bhide et al. | 717/174 |
| 7,971,258 B1 * | 6/2011 | Liao et al. | 726/24 |
| 2003/0126214 A1 * | 7/2003 | Oliszewski | 709/206 |
| 2004/0034794 A1 * | 2/2004 | Mayer et al. | 713/200 |
| 2005/0015606 A1 * | 1/2005 | Blamires et al. | 713/188 |
| 2005/0193188 A1 * | 9/2005 | Huang | 713/1 |
| 2005/0278432 A1 * | 12/2005 | Feinleib et al. | 709/213 |
| 2005/0283640 A1 * | 12/2005 | Cheston et al. | 714/4 |
| 2006/0075486 A1 * | 4/2006 | Lin et al. | 726/20 |
| 2006/0236108 A1 * | 10/2006 | Andrews | 713/170 |
| 2007/0169198 A1 * | 7/2007 | Madddaloni et al. | 726/24 |
| 2007/0261118 A1 * | 11/2007 | Lu | 726/24 |
| 2008/0256635 A1 * | 10/2008 | Gassoway | 726/24 |
| 2008/0282351 A1 * | 11/2008 | Khilnani et al. | 726/24 |
| 2009/0037496 A1 * | 2/2009 | Chong et al. | 707/204 |

* cited by examiner ary adware, and other malicious and unwanted software ("malware").
MALWARE AUTOMATED REMOVAL SYSTEM AND METHOD USING A DIAGNOSTIC OPERATING SYSTEM

CROSS-REFERENCES TO RELATED APPLICATIONS

This application is a continuation-in-part of prior U.S. application Ser. No. 11/825,168, filed Jul. 5, 2007, and hereby incorporated by reference, which claims the benefit of provisional U.S. Application No. 60/818,809, filed Jul. 5, 2006, and hereby incorporated by reference. This application also claims the benefit of U.S. Provisional Application No. 61/134,673, filed Jul. 11, 2008, and hereby incorporated by reference. This application is related to PCT Application No. PCT/US/US2007/015580, filed Jul. 5, 2007, and hereby incorporated by reference.

FIELD OF THE INVENTION

The present invention relates to software for the removal of computer viruses, worms, Trojan horses, spyware, dishonest adware, and other malicious and unwanted software ("malware").

SUMMARY OF THE INVENTION

While many programs exist that can remove malware, none of these programs is capable of removing as many malware infestations as a combination of products. Consequently, the best industry practice requires the operation of multiple malware removal software products. This is currently a difficult, time-consuming process, which is often rendered ineffective by failure to prevent malware from being active during the malware removal process.

The present invention automates the operation of multiple malware removal software products. In addition, the present system improves the performance of these software products by executing them in a Diagnostic Operating System, isolated from any malware possibly infecting the Normal Operating System of the computer. In addition, the Diagnostic Operating System allows the automation of tasks beyond that which is available under the Normal Operating System.

Certain malware removal applications that include logic expecting to utilize the Normal Operating System's environment of options and variables receive redirection from the Diagnostic Operating System, causing them to correctly access these options and variables. Such applications thereby function under the Diagnostic Operating System as they would under the Normal Operating System. In some circumstances, the timing of such redirection is critical, which may be handled by delay or by monitoring the malware removal application while it executes. Because of the potential diversity among the suite of malware removal applications being run, a malware removal coordinating program accesses diagnostic parameters defining application-specific processing behaviors. Event-triggered redirection of environment variables may be done by either injection of values or interception of name/key invocations.

DETAILED DESCRIPTION OF THE INVENTION

Standard Operating Modes

The present invention automates proven manual malware removal processes in order to minimize the total time and maximize the success rate of removal. The automation allows multiple third-party malware removal software programs to be run in a fraction of the time normally required. The present invention operates by providing a Diagnostic Operating System (OS) within which malware removal applications can execute in safety from the malware potentially infecting components of the Normal OS. The Normal OS is the operating system to which a personal computer ordinarily boots when it is being used for productive or recreational purposes.

Figure 1:
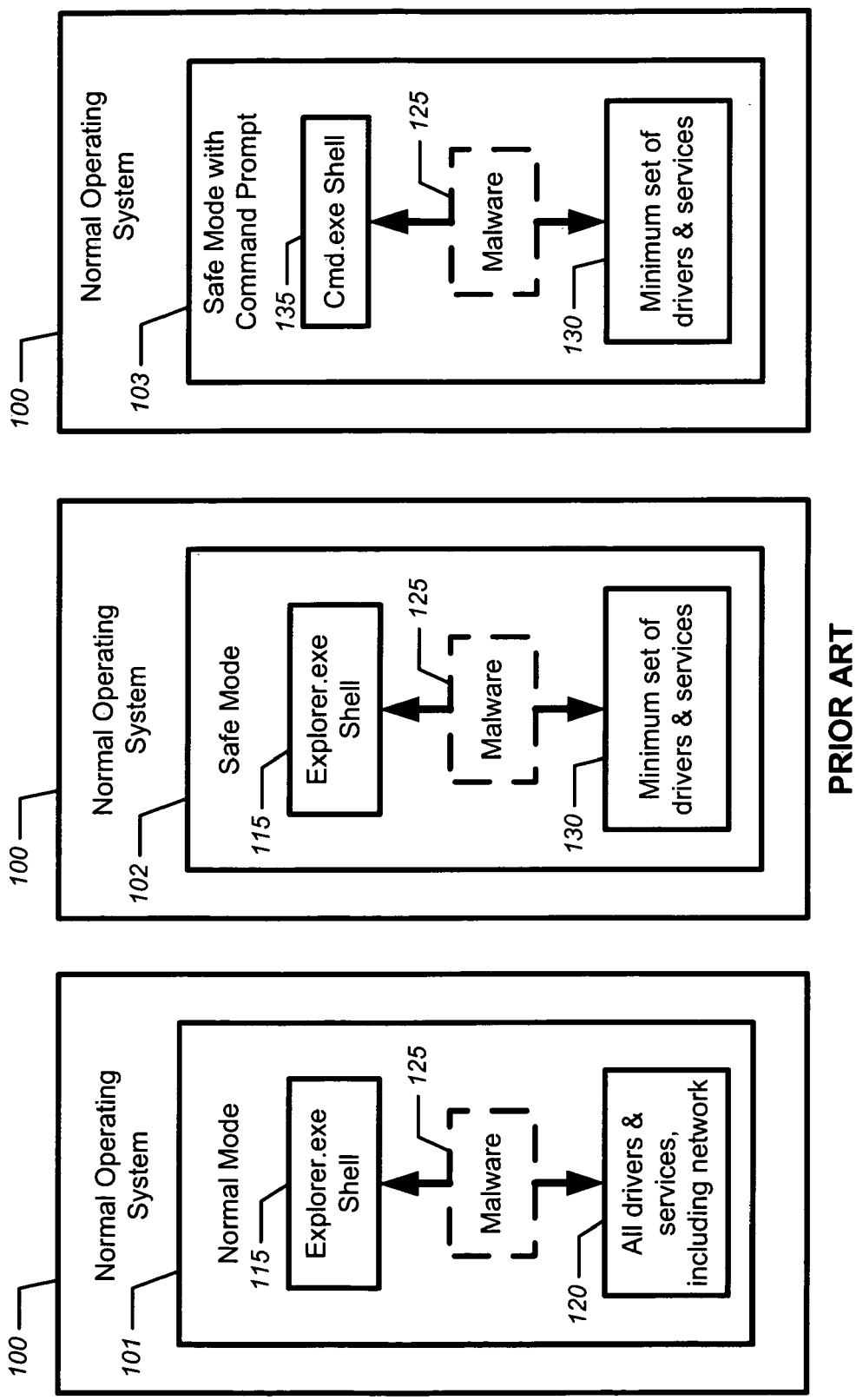
FIG. 1 is a schematic drawing of standard modes in a personal computer operating under the Normal Operating System.

FIG. 1 shows three standard modes available for a personal computer under a Normal OS 100 of the WINDOWS-type provided by Microsoft Corporation. The Normal Mode 101 uses the WINDOWS Explorer.exe shell to provide the user interface. A shell is an interface that provides a user of the computer with access to services of the operating system. Normal Mode 101 is the mode used for normal operation of the computer system. As part of this mode, the system operates with a full complement of drivers and services 120, including those services necessary for network and Internet connectivity. In some circumstances, a computer system can be infected with malware 125. It may be possible to run malware removal software in the Normal Mode and successfully remove the malware infestation. Unfortunately, however, it can often be difficult to remove malware that is currently operating or running. Thus, many malware programs 125 are designed to operate whenever the normal drivers and services 120 are loaded in the Normal Mode 101. In particular, as indicated by arrows in FIG. 1, malware 125 might infect the shell, or system drivers or services. Consequently, such malware 125 may be running whenever the computer is in Normal Mode 101, thereby confounding the malware removal programs.

As a consequence, many malware removal application developers recommend that their software be run while the computer is in Safe Mode 102. In this mode, the computer starts with only a minimum set of drivers and services 130. This reduces the functionality of the computer, eliminating capabilities such as network and Internet connectivity. As a result, Safe Mode 102 is not appropriate for normal computer operation. The benefit of Safe Mode 102 is that it is easier to isolate problems because many non-core services and drivers are disabled. By limiting the number of components operating in conjunction with the Explorer shell 115, Safe Mode 102 reduces the number of malware programs 125 that are operating. As a consequence, malware removal applications will have an easier time of removing these malware programs 125. Unfortunately, some malware programs 125 are triggered by the operation of the Explorer shell 115 itself, thereby starting whenever that shell starts up. Since the Explorer shell 115 is run whenever the computer operates in either Normal Mode 101 or Safe Mode 102, such malware 125 will also always be running in these modes. Even the minimum set of drivers and services 130 can, therefore, be infected by malware 125.

A third mode is known as Safe Mode with Command Prompt, or Command Mode 103. In Command Mode 103, the same minimum set of drivers and services 120 are operating. Instead of operating the Explorer shell 115 to provide the user interface, the Command Mode 103 uses the Cmd.exe shell 135. The Cmd.exe shell 135 provides a simplified command line user interface for users. Although this shell is more difficult for users to use, the Cmd.exe shell 135 has the benefit of not launching malware programs 125 that are programmed to automatically launch along with the Explorer shell 115. Of course, because the Cmd.exe shell 135 is well known, it is possible that malware developers can trigger their malware 125 to launch along with the Cmd.exe shell 135 or with the minimum set of drivers and services 130.

Normal OS: Filesystem During Execution of a Malware Removal Program

Figure 2:
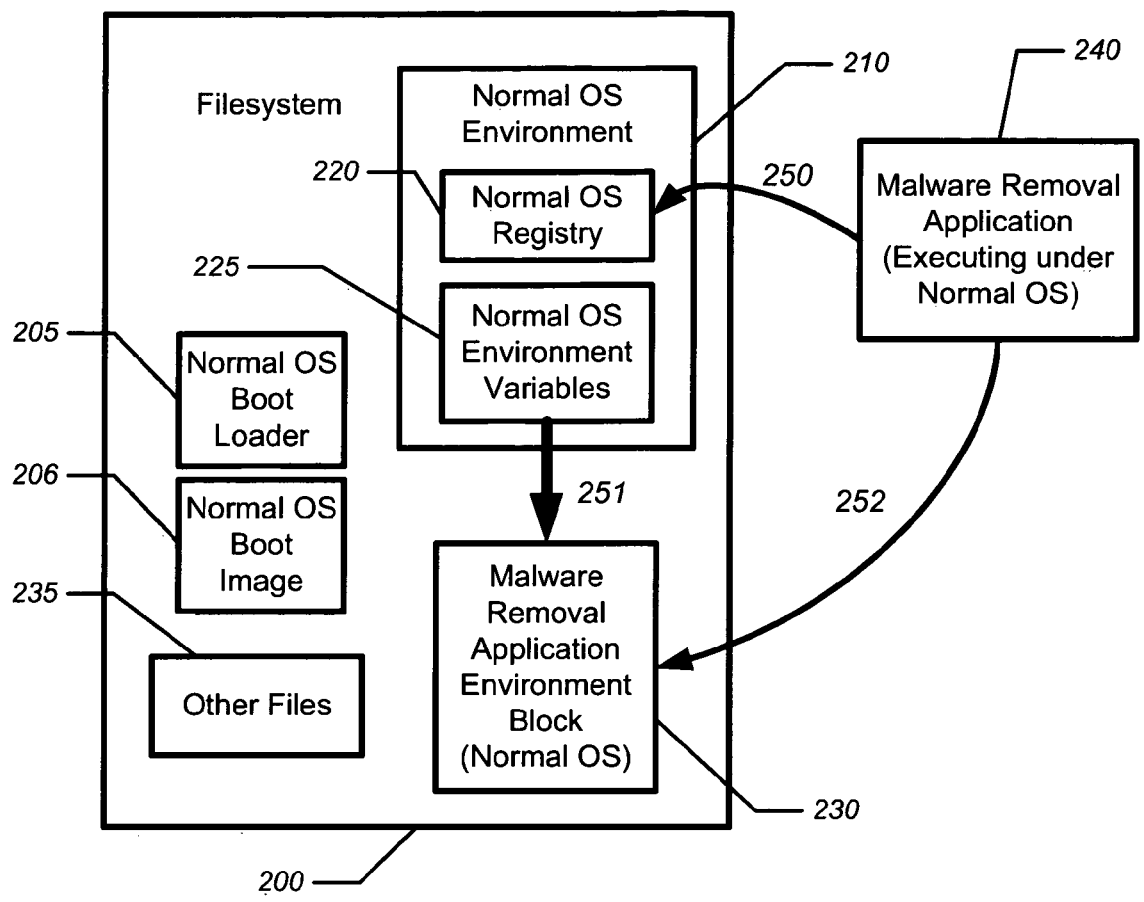
FIG. 2 is a schematic drawing illustrating the computer's filesystem while a malware removal application is executing under the Normal Operating System.
Figure 3:
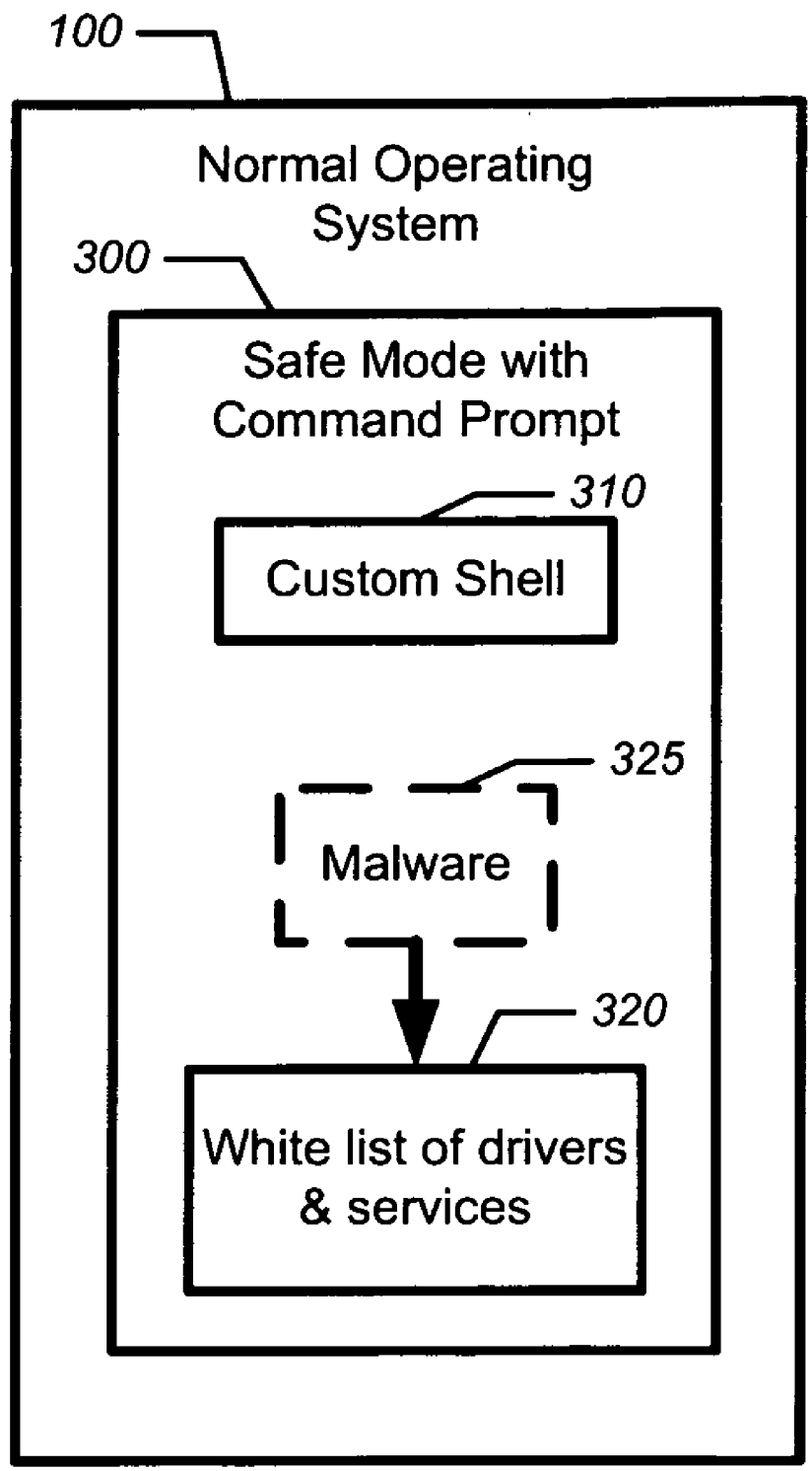
FIG. 3 is a schematic drawing of Custom Safe Mode, which operates under the Normal Operating System.

FIG. 2 is a schematic drawing illustrating a computer's filesystem 200 while a malware removal application 240 is executing under the Normal OS 100 in any of the modes depicted in FIG. 1 or FIG. 3. Under control of a boot loader 205, the Normal OS 100 boots a boot image 206, thereby initiating the Normal OS 100, which in turn provides a Normal OS environment 210. An environment, which is saved to and accessed from storage on the computer, makes various variables and options available to applications running under the OS. The environment may contain, for example, information about the types and locations of system resources; the state of the runtime environment; the operating system and other software; and user settings. The figure shows a Normal OS environment 210 in which some of the environment variables are contained in a Normal OS registry 220, and other Normal OS environment variables 225 are located elsewhere.

The Normal OS registry 220 is a centralized data repository. WINDOWS-type operating systems have this organization. Some other operating systems, such as UNIX and Linux do not have a registry.

When execution of a user application, such as a malware removal application 240, is initiated, an environment block is established in the filesystem. The environment block contains variables that are specific to the executing instance of the application. The Normal OS environment variables 225 will have been copied by the OS into the environment block 230 when execution of the malware removal application 240 is initiated, as indicated by the arrow labeled 251. The application executing under the Normal OS 100 will typically access environment variables in its environment block 230, as indicated by the arrow labeled 252. The malware removal application 240 will typically also access environment variables in the Normal OS registry 220, as indicated by the arrow labeled 250. A commercial malware removal application will usually depend upon the environment variables being found in these standard locations and having the values routinely provided by the Normal OS 100, in order to function properly.

The filesystem 200 will also contain other files 235, some of which may be infected with malware. Examples include application software and user data files.

Custom Safe Mode

FIG. 3 shows a fourth mode for malware removal. Custom Safe Mode 300 is described in U.S. application Ser. No. 11/825,168, previously incorporated herein by reference. This mode also operates under the Normal OS 100 of the computer, but in contrast with the standard modes shown in FIG. 1, uses a custom shell 310. The Custom Safe Mode 300 operates with a minimum set of drivers and services 120, which are created by starting with the Safe Mode 102 and then systematically killing all operating processes that are not found in a white list 320 of allowed processes. By creating a new custom shell 310, the Custom Safe Mode 300 prevents the loading of those malware programs 125 that are triggered upon the loading of a known standard shell. All that is required is that the safe shell 310 has a name that is different than the known names of the shells 115, 135 provided with the operating system. Furthermore, by eliminating all processes that are not found in the white list 320 of needed processes, the Custom Safe Mode 300 further prevents the loading and operation of malware programs 125 that are loaded using other mechanisms (such as by alteration of the system registry values).

Diagnostic Mode

Custom Safe Mode 300 reduces the drivers and services used in a malware 425 removal operation to those contained in a white list 320 by shutting down unnecessary ones that are automatically started by the Normal OS 100. Unfortunately, it is nevertheless possible that malware 125 infecting applications left executing according to the white list 320, or even non-white listed applications executing only momentarily until shut down, may corrupt the malware 425 removal process.

Figure 4:
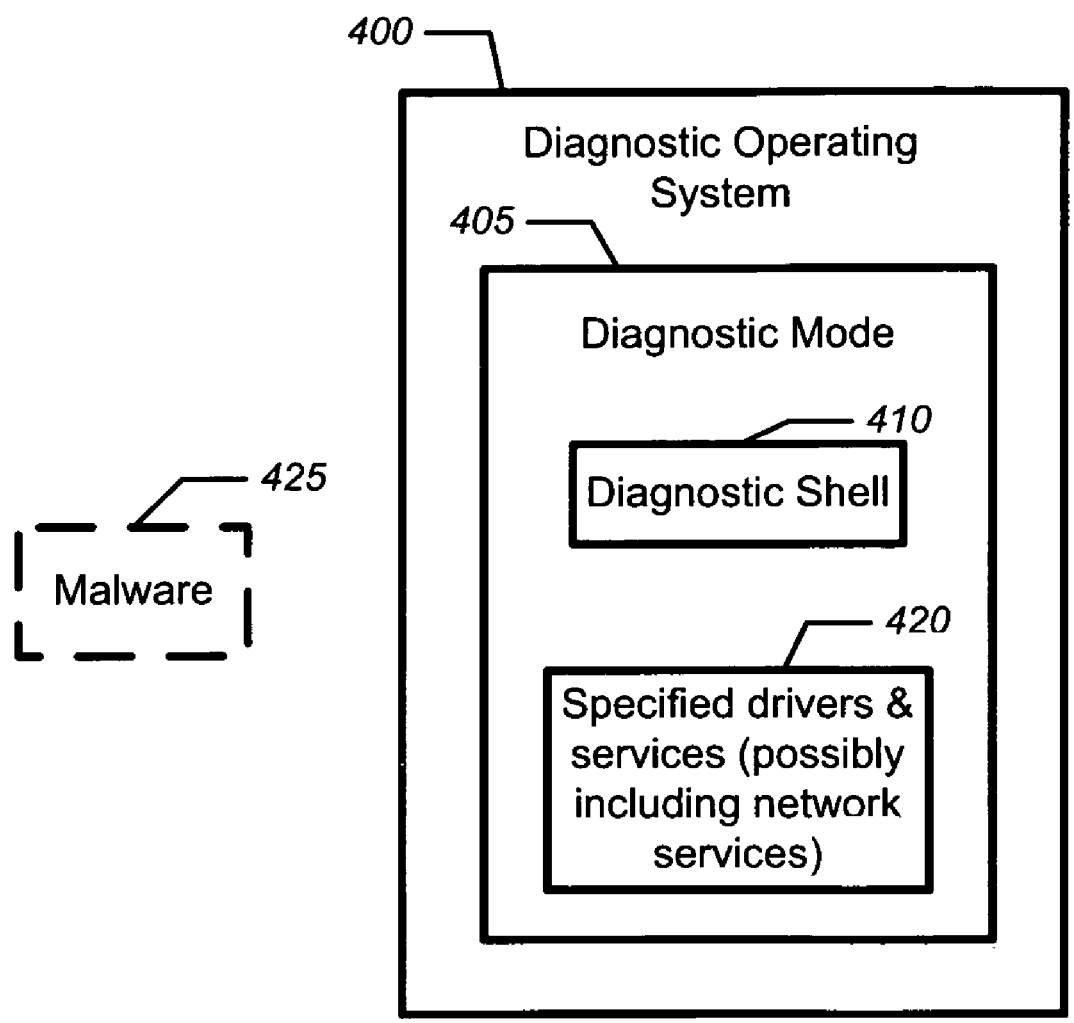
FIG. 4 is a schematic drawing of Diagnostic Mode, which operates under a special Diagnostic Operating System.

FIG. 4 illustrates Diagnostic Mode 405, a fifth mode of operation of a personal computer. In contrast to the four modes already described, Diagnostic Mode 405 operates in a Diagnostic Shell 410, under a Diagnostic OS 400, distinct from the Normal OS 100. The Diagnostic OS 400 can be stored on a medium disconnected from the target computer itself, isolated from potential malware 425 infections that can occur, particularly through network connections, while the computer is operating in Normal Mode 101. Indeed, the Diagnostic OS 400 may be booted and installed, specifically for a malware 425 removal operation, from a medium, such as a CD or DVD, whose safety is ensured by being read-only. When the Diagnostic OS 400 boots, execution of only specified drivers and services 420 will be initiated, and these drivers and services 420 may themselves be read from a secure external medium, such as the medium from which the Diagnostic OS 400 is booted. The Normal OS 100 will simply not be given an opportunity to initiate any applications. The Diagnostic OS 400 might or might not provide network services.

In some embodiments, the Diagnostic OS 400 is installed in a read-only context. For example, the Diagnostic OS 400 may be installed into a filesystem located in RAM disk. RAM disk is an adaptation of computer memory to have the functionality of a disk drive. The files containing the Diagnostic OS 400 might be designated as read-only, preventing any running process from possibly tainting operation of the Diagnostic OS 400.

The Diagnostic OS 400 might be based on a lightweight version of WINDOWS, such as WINDOWS Preinstallation Environment (WINDOWS PE), or any other OS that can provide the functionality for the process of the invention described herein. The Diagnostic Shell 410 might be a shell similar to the custom shell 310 of Custom Safe Mode 300, or to WINDOWS Cmd.exe shell 135. Because functional distinctions between the Diagnostic OS 400 and the Diagnostic Shell 410 are less important than in previously described modes, we will henceforth refer to Diagnostic Mode 405 and the Diagnostic OS 400 interchangeably unless warranted by a particular context, recognizing that a Diagnostic Shell 410 is also implicitly involved.

Target Computer System

Figure 5:
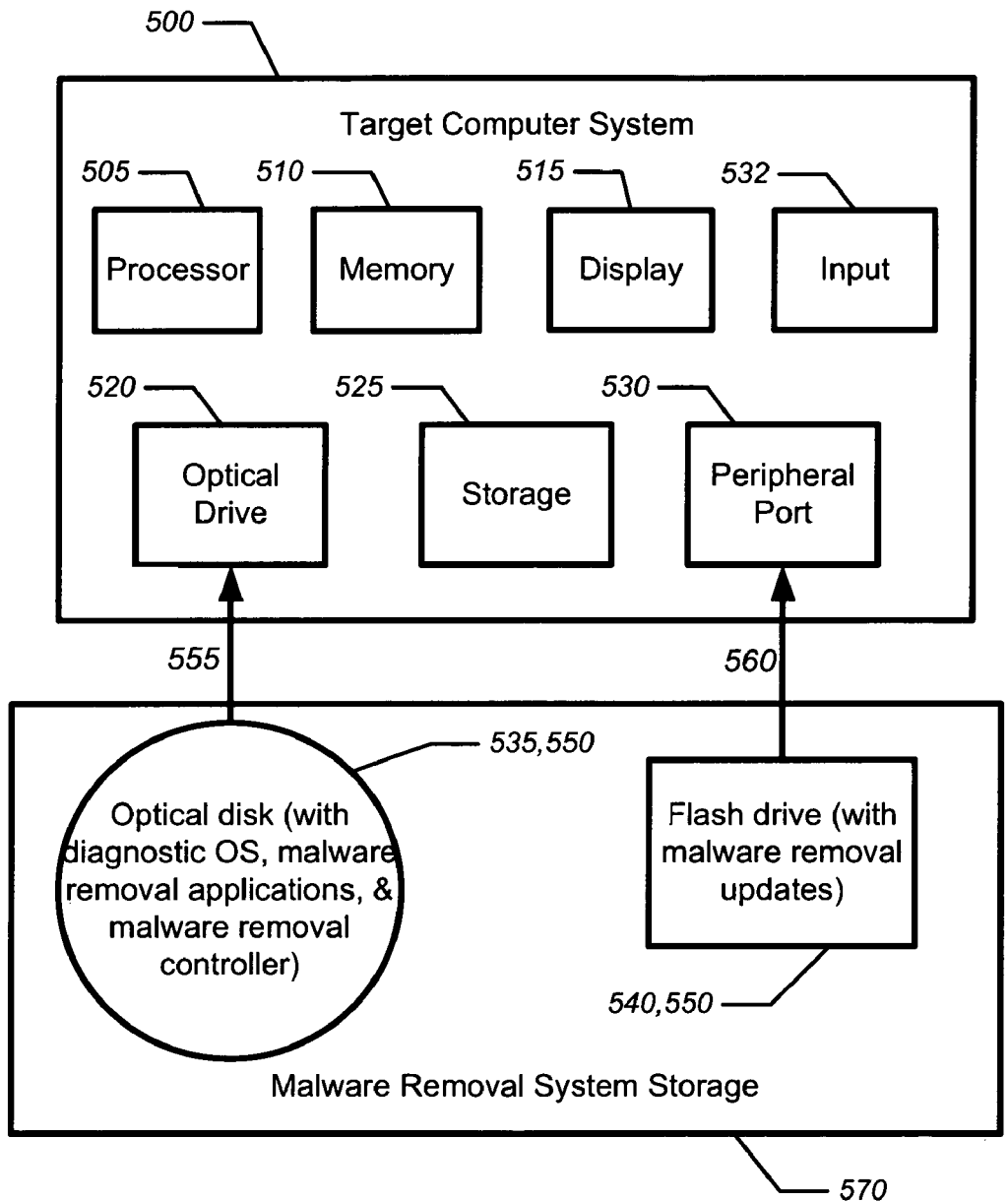
FIG. 5 is a schematic drawing of the target computer system, and storage for the malware removal system, in an embodiment of the present invention.

FIG. 5 illustrates an embodiment of a target computer system 500 upon which Diagnostic Mode 405 might be used for malware removal operations. The computer system 500 has a processor 505, random access memory 510, an optical drive 520, a display 515, and one or more input devices 532, as are commonly used by most computer systems 500. In addition, the computer system 500 has non-volatile memory or storage 525. The storage 525 includes a filesystem, which may be used to store files and programs such as those shown in FIGS. 2 and 7. The storage 525 includes one or more storage devices, such as hard drives, solid state drives, and flash drives. These storage devices might be internal or external devices, or some combination thereof.

In the preferred embodiment of the invention, the computer system 500 also includes components that allow one or more removable storage devices 550 (i.e., external tangible hardware components containing files) to be connected to, and accessed by, the computer system 500. In the sample embodiment of the present invention shown in the figure, the computer system 500 includes an optical drive 520, which could allow the contents of a CD or DVD, which is inserted into the drive, to be accessed; and a peripheral port 530 (e.g., a USB port or a FireWire port), which would allow the contents of a compatibly configured flash drive or external hard disk to be accessed. Arrows 555 and 560 designate the respective connections of these devices to the computer system 500.

Initiating the malware removal process from malware removal system storage 570 that is external to, and independent of, the target computer system 500 is more secure than using internal storage for that purpose. The external media can be created by a computer, other than the target computer, that is known to be free of malware 425. Also, external media, such as a flash drive and/or an optical disk, makes the malware removal system storage 570 portable, so that a technician can carry it to a remote site to service a client computer. In the preferred embodiment of the invention, a read-only external storage device, or apparatus, such as an optical disk 535, contains the Diagnostic OS 400, a plurality of malware removal applications, and a malware removal controller program; a writable external storage device, such as a flash drive 540, contains malware removal updates. Separating the updates 640 from the less volatile portions of the components of the malware removal system allows the optical disk 535 to be reused for days or even longer, so long as the basic versions of the malware removal applications contained therein have not become obsolete. The updates (e.g., malware definitions and code) on the flash drive 540 might be updated daily, and potentially used on several client computers during the course of a day. The contents of the malware removal system storage 570 in an embodiment of the present invention will be described in more detail below in relation to FIG. 6.

Many other allocations of the software among storage devices are possible within the scope of the invention, but with varying degrees of preference. In principle, aspects of the invention can be practiced with the normal storage 525 of a computer, in combination with (1) a single external removable apparatus that is writable (e.g., a flash drive 540), or (2) even with no external removable device at all (with some loss of security, flexibility, and portability).

For example, updates may be applied to malware removal applications from an external storage device distinct from the external storage device from which the Diagnostic OS 400 is booted. This approach corresponds to the configuration of the malware removal system storage 570. On the other hand, the Diagnostic OS 400 might support some network services, so that the malware removal applications could be updated by communication across a network, without a separate hardware device containing updates. The network could be any kind of communication network, such as a wide area network, a local area network, or a personal area network. A third possibility is to simply use the malware removal applications, as found on the external device from which the Diagnostic OS 400 is booted, directly without updating them. This last approach might well be applied, for example, on the day that an optical disk 535 containing the Diagnostic OS 400 is created, assuming that all malware removal applications burned onto the disk are current as of that time.

Malware Removal System Storage

Figure 6:
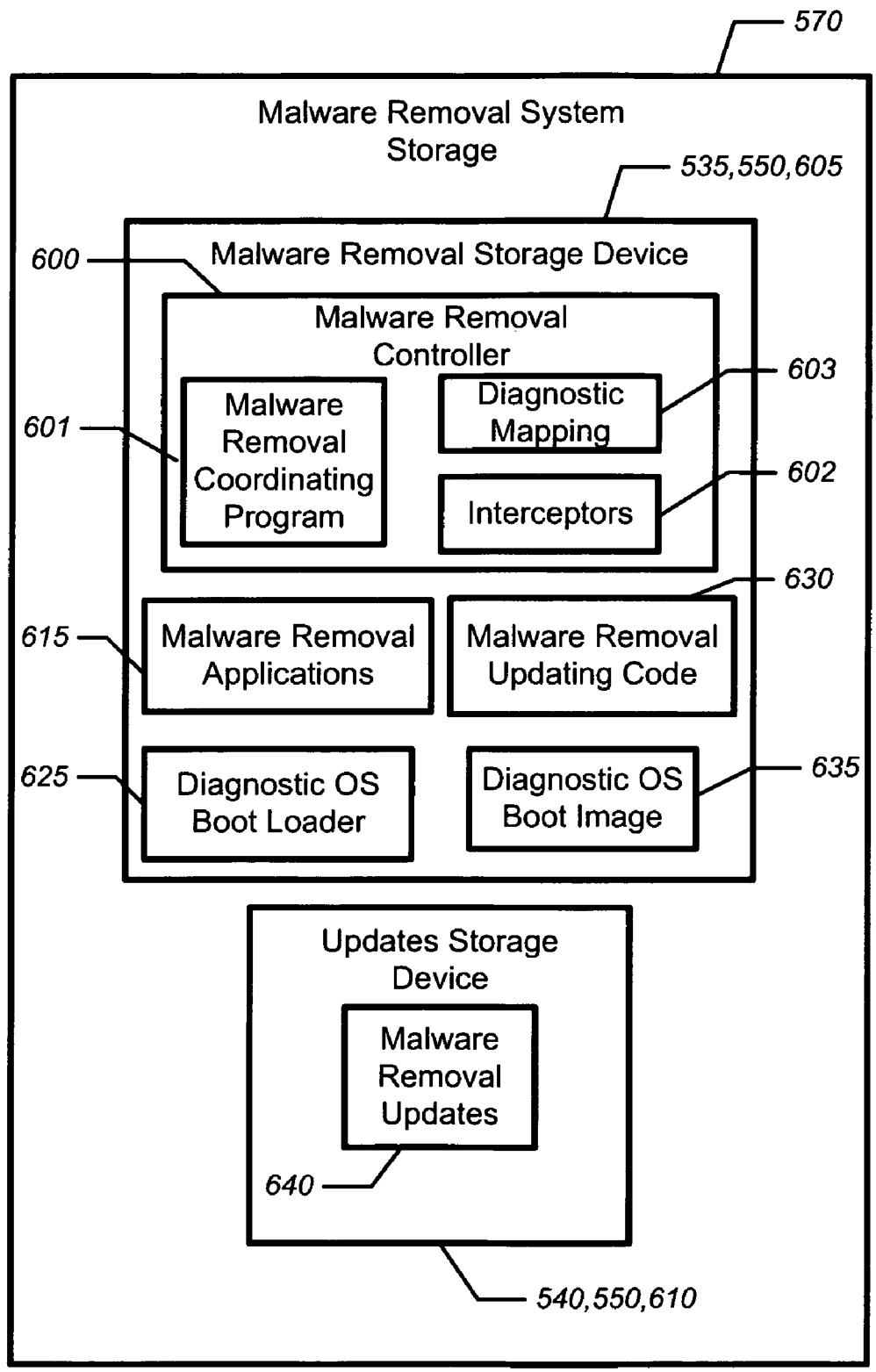
FIG. 6 is a schematic drawing of files contained in malware removal system storage in an embodiment of the present invention.

A number of software components, such as those shown in FIG. 6, combine with the computer system 500 hardware of FIG. 5, upon which they execute, to form an effective malware removal system. In the preferred embodiment of the invention, security is maximized because the software elements are stored and maintained on media external to the target computer system 500. FIG. 6 shows an example arrangement of the files that might be contained on the removable storage devices 550 to support the Diagnostic Mode 405. As mentioned previously, other allocations of the files between the removable storage devices 550, as well as among the removable storage devices 550 and other storage 525 of the computer system 500 are also possible within the scope of the invention.

Two removable storage devices 550 are shown in FIG. 6, a malware removal storage device 605 and an updates storage device 610, preferably corresponding to the optical disk 535 and the flash drive 540, respectively, of FIG. 5. Software on the malware removal storage device 605 includes a Diagnostic OS boot loader 625, a Diagnostic OS boot image 635, a suite of one or more malware removal applications 615, malware removal updating code 630, and a Malware Removal Controller 600. The updates storage device 610 contains updates 640 for the malware removal applications 615.

The Diagnostic OS boot image 635 is the software implementing the Diagnostic OS 400. The Diagnostic OS boot loader 625 is the software that causes the computer to load and initiate execution of the Diagnostic OS boot image 635 upon reboot. The target computer 500 must have been configured to boot after cold start (e.g., upon pressing a power-on switch after the computer has been powered off), or to reboot, from the external media (i.e., the optical disk 535 or flash drive 540, depending on which holds the Diagnostic OS boot loader 625 and Diagnostic OS boot image 635). The Diagnostic OS boot loader 625 and Diagnostic OS boot image 635 may be commercial software such as WINDOWS PE, or some other relatively simple and lean operating system. The malware removal applications 615 may be commercially available applications or custom applications. The malware removal updating code 630 is software to incorporate updates into the malware removal applications 615. Typically, each malware removal application 615 will require specific malware removal updating code 630. In fact, the respective malware removal updating code 630 will typically be combined into a single program with the malware removal application 615 itself, and can be invoked by initiating execution of the malware removal application 615 with initialization information (e.g., an initialization file or command-line parameters) that (1) requests an update 640; and (2) points to a location in the filesystem where the updates 640 can be found. The malware removal updating code 630 is shown separately from the malware removal application 615 for both clarity and generality.

Key to the invention, the Malware Removal Controller 600 contains a Malware Removal Coordinating Program 601, a Diagnostic Mapping 603 and, optionally, one or more Interceptors 602. The Malware Removal Coordinating Program 601 is software that, when executed on the target computer system 500 in the Diagnostic Mode 405, causes each malware removal application 615 to be updated using the respective malware removal updating code 630 in combination with the malware removal updates 640 from the updates storage device 610; initiates execution of each malware removal application 615; and facilitates any necessary redirection of variable accesses from the Diagnostic OS 400 environment to the Normal OS 100 environment.

The malware removal applications 615 may be quite heterogeneous regarding the parameters required to get them to perform properly. A given malware removal application 615 might be idiosyncratic, for example, with respect to (1) how it is initiated; (2) how it is updated; and (3) whether and in what manner it depends upon the Normal OS 100 environment to execute properly. Regarding some aspects, several malware removal applications 615 may have similar or identical requirements, and can be treated as a group. The individual and group processing information is contained in the Diagnostic Mapping 603, which pairs each malware removal application 615 with its particular processing needs. This Diagnostic Mapping 603 might have several forms. Some or all of this data might be in the form of a file containing a table or list. Some or all of the data might be hard-coded into the Malware Removal Coordinating Program 601 itself. In any case, the relevant data will be contained in one or more files on the malware removal storage device 605.

The Malware Removal Controller 600 may also contain one or more Interceptors 602. An Interceptor 602 is software configured to cause redirection of variable accesses by a malware removal application 615 from the Diagnostic OS Environment 740 to the Normal OS Environment 710. Interceptors 602 will be explained in more detail in the discussion of FIG. 8.

Diagnostic Mode: Filesystem During Execution of a Malware Removal Program

Figure 7:
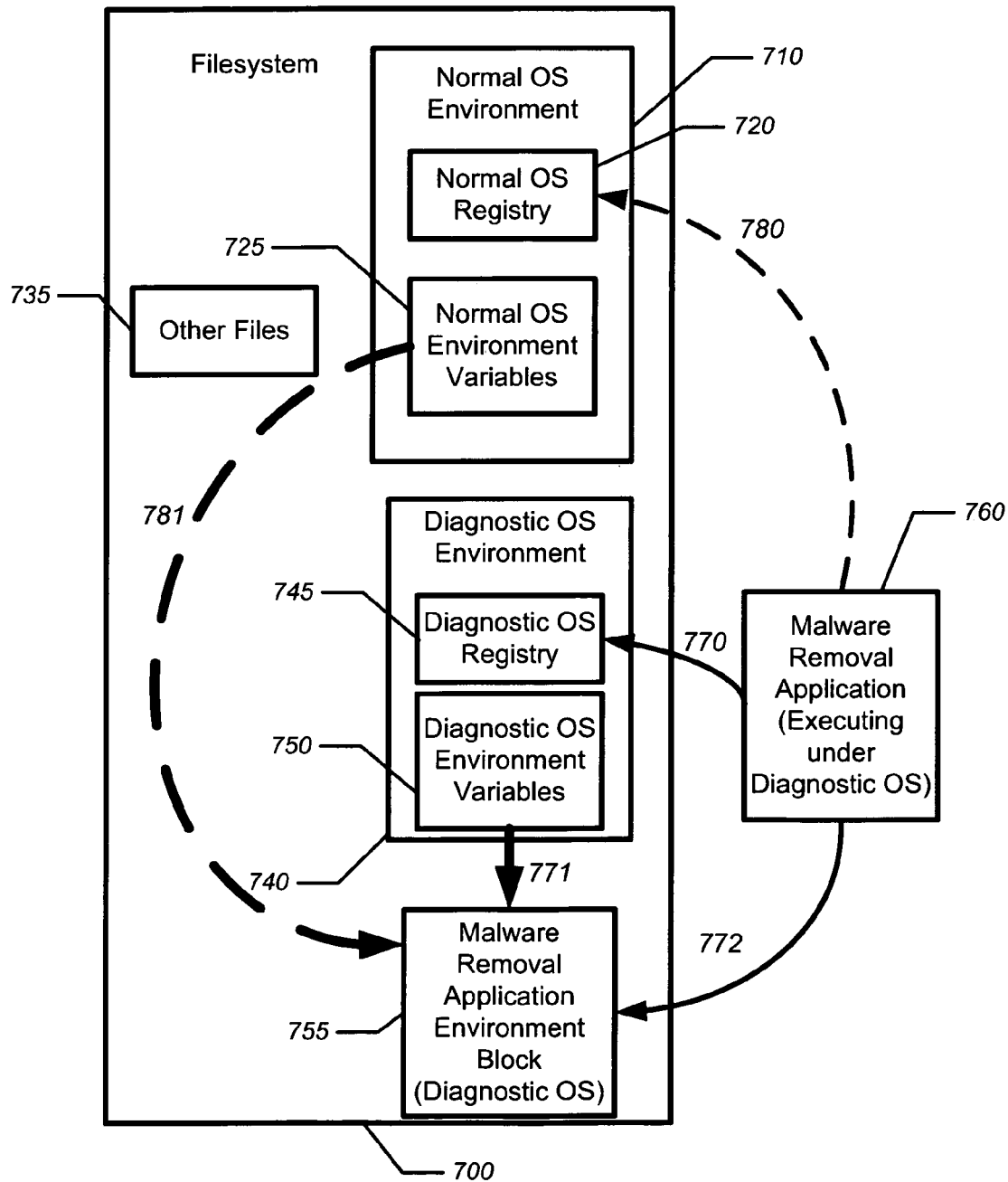
FIG. 7 is a schematic drawing illustrating the computer's filesystem in an embodiment of the present invention, when a malware removal application executes under Diagnostic Mode.

FIG. 7 shows the content of the computer's filesystem 700 during execution of a typical malware removal application 615 in Diagnostic Mode 405. Under the Diagnostic OS 400, the filesystem 700 will still contain essentially all of the files present under the Normal OS 100, as depicted in FIG. 2. (Some temporary files used by the Normal OS 100 and applications running under the Normal OS 100 are an exception.) Still present are the Normal OS Environment 710, including the Normal OS Registry 720 (if the OS is WINDOWS or similar OS) and the other Normal OS Environment variables 725, as well as other files 735.

When the Diagnostic OS 400 boots, it establishes a Diagnostic OS Environment 740 separate from the Normal OS Environment 710. If the Diagnostic OS 400 is similar to WINDOWS, it will set up in the filesystem 700 a Diagnostic OS Registry 745 and a set of Diagnostic OS Environment variables 750. In general, the locations, options, and settings stored within the Diagnostic OS Environment 740 will be different from those of the Normal OS Environment 710.

If the Diagnostic OS Environment 740 is based upon a WINDOWS-type OS, then the Diagnostic OS Registry 745 may correspond to a separate hive from the hive corresponding to the Normal OS Registry 720. The Diagnostic OS Registry 745 hive might contain a link or pointer to the Normal OS Registry 720.

During initiation of a malware removal application 615 for execution, a malware removal application Environment Block 755, containing parameters specific to this execution instance of the malware removal application 615, will be populated with values. As indicated by the arrow labeled 771, the malware removal application Environment Block 755 will receive values of a plurality of variables from the Diagnostic OS Environment variables 750.

By default, the malware removal application 615 would access the variable values found in the Diagnostic OS Registry 745 and the malware removal application Environment Block 755, as created by the Diagnostic OS 400. Significantly, however, a commercial malware removal application 615 is typically coded to execute under the Normal OS 100 with the standard configuration as depicted in FIG. 2, and not under the Diagnostic OS 400 with the Diagnostic OS Environment 740. The variables that would be accessed by default within the Diagnostic OS 400 will, therefore, not produce the correct results, and might even be expected to cause the malware removal application 615 to crash, thereby compromising or improperly terminating the malware removal process.

For each malware removal application 615 for which this problem of access to the correct set of environment variables exists (in principle, an application might not have this problem, for example, if it were custom configured to work with the process of the invention), the Malware Removal Coordinating Program 601 reconciles the malware removal application 615 with the Diagnostic OS Environment 740 by redirecting the application to access variables having the correct values. As depicted by arrow 780, the malware removal application 615 may be redirected to use the Normal OS Registry 720 rather than the Diagnostic OS Registry 745 for some variables. The values of Normal OS Environment variables 725 may be substituted for those of Diagnostic OS Environment variables 750 in the malware removal application Environment Block 755, as indicated by arrow 781. In some situations, such redirection may be carried out indirectly by the Malware Removal Coordinating Program 601 through the agency of Interceptors 602. In other situations, redirection may be carried out by variable value substitution. In either case, redirection by the Malware Removal Coordinating Program 601 effectively tricks the logic of the executing malware removal application 615 so that the application removes malware 425 just as it would when executing under the Normal OS 100.

Some caveats should be mentioned at this point. First, for some applications, redirection is timing critical. Second, whether it is appropriate to redirect the whole registry, or just specific variables within the registry, depends upon the idiosyncrasies of the individual application. Third, the selection and timing of redirection of environment variables is application-specific. Application-specific processing parameters, including those relating to redirection, are available to the Malware Removal Coordinating Program 601 from the Diagnostic Mapping 603.

Injectors and Substitutions

Environment variables, whether stored in a registry or elsewhere, are generally organized in name-value pairs. In some contexts, such as in a registry, access to such pairs may be done through a "key". A key behaves like a folder. A key may have an associated value. A key may contain one or more name-value pairs. A name-value pair maps a given variable name to a corresponding variable value. In some cases, such as in the registry in WINDOWS-type operating systems, keys may be organized hierarchically in a tree-like structure. To redirect an malware removal application 615 with respect to some parameter it needs, the Malware Removal Coordinating Program 601 can either cause the malware removal application 615 to access a different name, or inject (i.e., substitute) a different value to be associated with the variable name.

In some embodiments, the malware removal application 615 may use the injection approach for redirection of variables in the malware removal application Environment Block 755. For example, upon boot of the Diagnostic OS 400, a variable named SystemRoot might be automatically set within the Diagnostic OS Environment variables 750 to have the value "c:\windows". (In a WINDOWS-type environment, this could be the operating system folder of the Diagnostic OS 400.) When execution of a malware removal application 615 is initialized, a corresponding name-value pair (SystemRoot=c:\windows) might be automatically created (see arrow 771) in the malware removal application Environment Block 755. The Malware Removal Coordinating Program 601 might change the value of SystemRoot in the malware removal application Environment Block 755 to the location of the operating system folder of the Normal OS 100, say "d:\windows".

Substitution for a variable value might be done once and only once, or the value of the variable might be changed several times during execution of the malware removal application 615. In the preferred embodiment, necessary substitutions for a given malware removal application 615 will typically be done only once, but may be delayed from the initiation of execution of that application. Substitution will be delayed until a triggering event occurs. A triggering event might be simply the lapse of a predetermined amount of time, or it might be an event involving one or more indicators of progress of the executing malware removal application 615 (e.g., state of a progress bar, or an entry in a log file).

Figure 8:
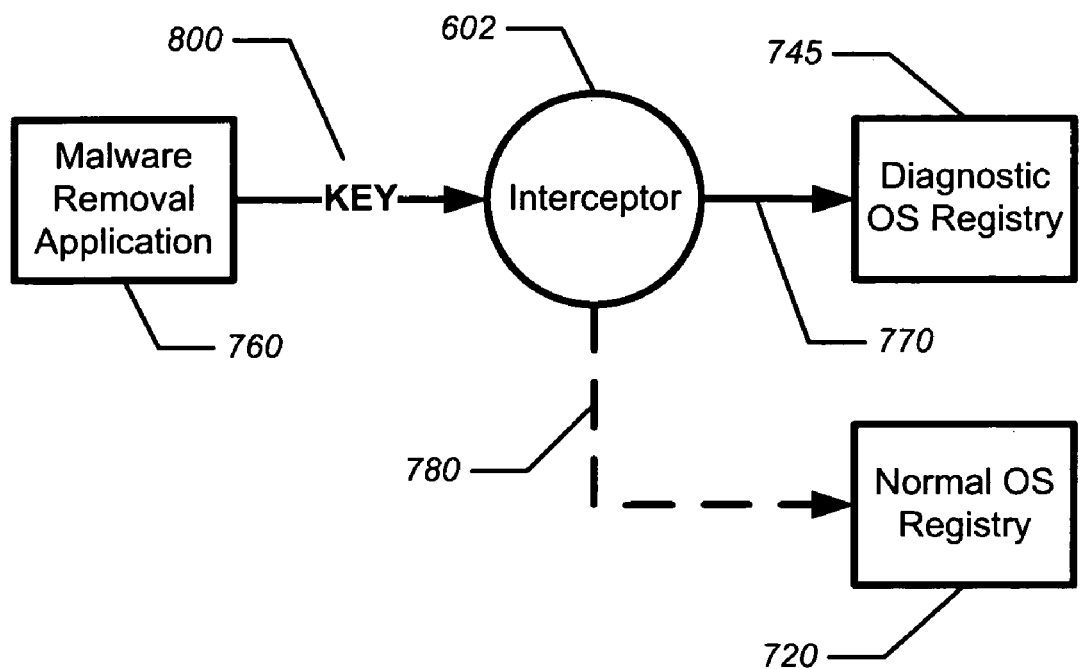
FIG. 8 is a schematic drawing illustrating the role of an interceptor in redirecting an attempt by a malware removal application to access an environment variable.

FIG. 8 is a schematic drawing illustrating redirection being performed by an Interceptor 602. The Interceptor 602 is typically included in a driver program that monitors accesses by the executing malware removal application 615 of environment variables. An access might be a read access or a write access. In the particular embodiment shown in the figure, the malware removal application 615 is attempting to access the registry by a key 800. Without an Interceptor 602, the malware removal application 615 would ordinarily access the Diagnostic OS Registry 745, because the application is running within the Diagnostic OS 400. The Interceptor 602 then chooses whether it is appropriate, depending upon the situation, for the malware removal application 615 to access the Diagnostic OS Registry 745 or the Normal OS Registry 720, and directs access accordingly (arrows 770 and arrow 780). If the access is a read, then the Normal OS 100 value of the environment variable corresponding to the name being accessed (or possibly corresponding to the key itself) will be returned. If the access is a write, then the Interceptor 602 will cause the value of the variable to be set in the appropriate registry.

Note that under some circumstances, an Interceptor 602 may redirect all registry accesses to the Normal OS Registry 720, while under others, redirection may be selective. Interception might be done at the key level or the name level, depending upon the situation. Also, the injection and interception techniques may be applied to both registry variables and other environment variables.

The Diagnostic Mapping 603 specifies to the software logic in the Malware Removal Coordinating Program 601 which redirections are required, the types of redirection (e.g., injection or interception), the frequencies of redirection (e.g., static or dynamic), and the triggers for redirection (e.g., lapse of time or some event). Such specifications are peculiar to the malware removal application 615, although simplifications are often possible by grouping malware removal applications 615 having similar requirements.

The Malware Removal Process

Overview

Figure 9:
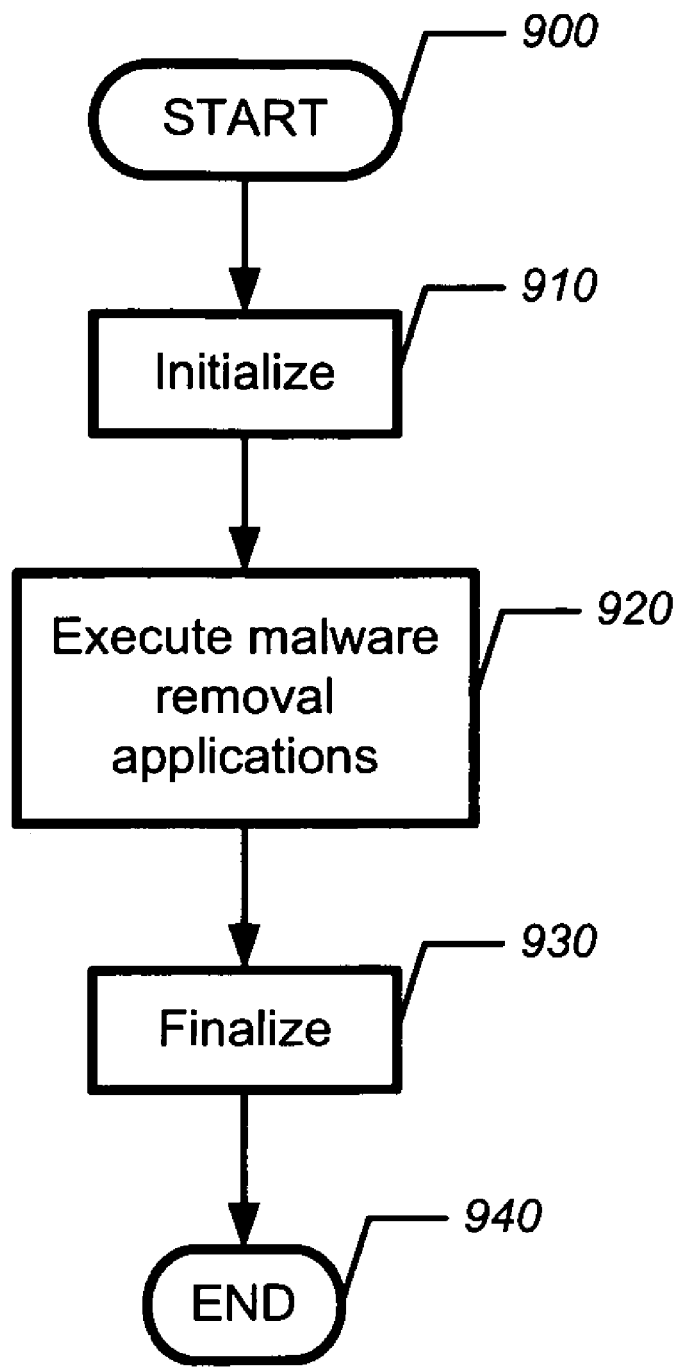
FIG. 9 is an overview flowchart defining three phases of the malware removal process, which are elaborated upon by the three subsequent figures.

FIG. 9 is a flowchart defining three phases of the malware removal process 900. The first phase 910 is to initialize the target computer 500. The next phase 920 is to execute the malware removal applications 615. The third phase 930 is to finalize the process. These three phases are detailed for an embodiment of the invention by FIGS. 10, 11, and 12, respectively. Most of steps in the following figures occur automatically under the control of a Malware Removal Coordinating Program 601 and Diagnostic Shell 410 without any user intervention. Indeed, only those steps below that specifically mention user interaction require any user input whatsoever. A practitioner in the art will recognize that some of the steps in FIG. 10-12 may be omitted, or executed in a different order from the order shown, in some embodiments of the invention.

Initialization Phase

Figure 10:
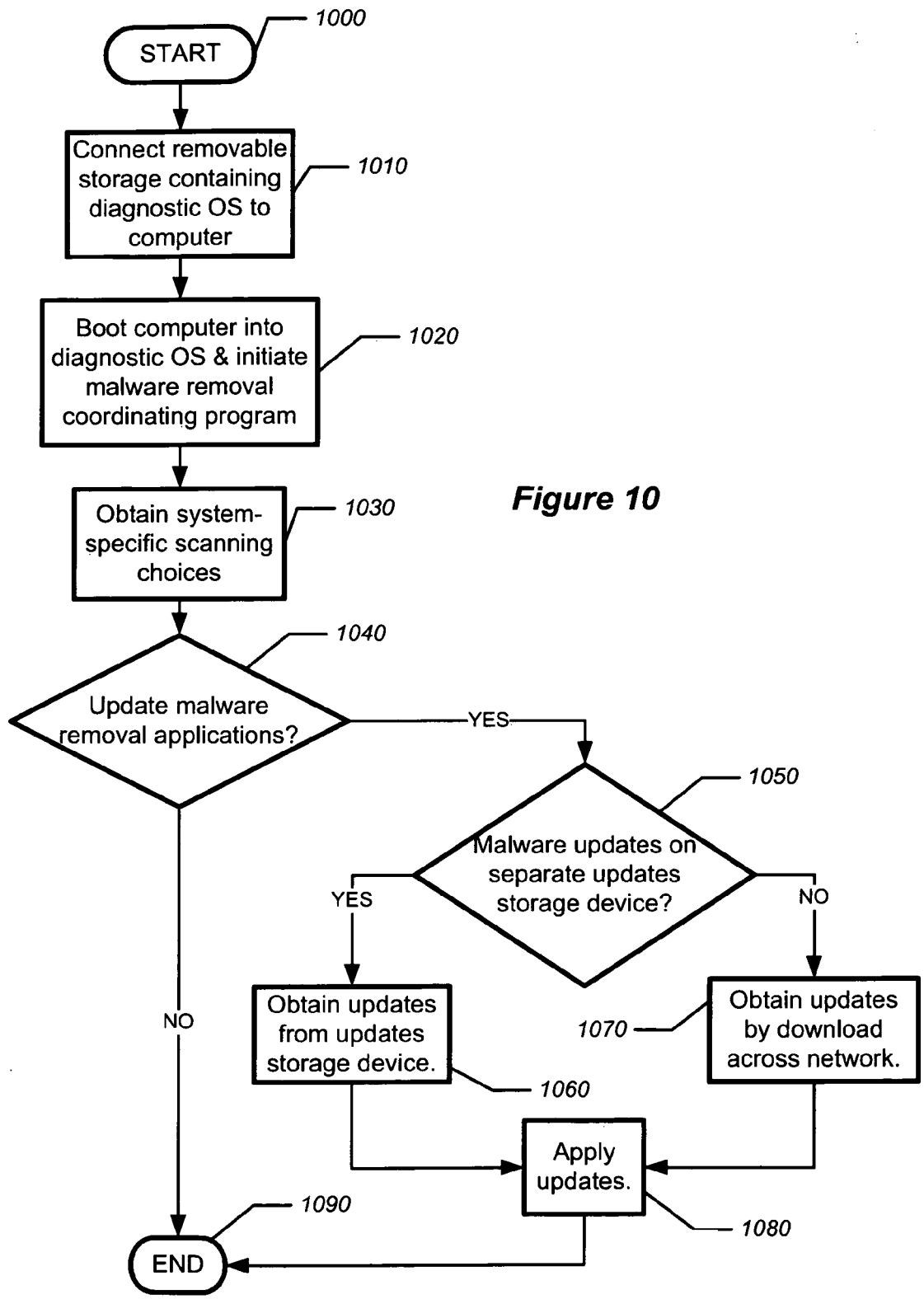
FIG. 10 is a detail flowchart for the initialization phase of the malware removal process in an embodiment of the present invention.

FIG. 10 is a flowchart for the initialization phase 1000 of the malware removal process in an embodiment of the invention. This phase gives example details for some embodiments of the invention corresponding to step 910 of FIG. 9. In step 1010, a removable storage device 550 containing the Diagnostic OS 400 is manually connected to the target computer 500, for example, by inserting an optical disk 535 into an optical drive 520. Typically, this removable storage device 550 will contain all the components of the malware removal storage device 605 shown in FIG. 6.

In step 1020, the target computer 500 is booted into the Diagnostic OS 400 and Diagnostic Shell 410. Booting the system is done manually by manipulating a power switch or by issuing an instruction causing a reboot of the target computer 500 from whatever operating system it is currently operating under. As shown in FIG. 4, execution of only specified drivers and services 420, including the Malware Removal Coordinating Program 601, will be initiated by the Diagnostic OS 400.

In step 1030, choices for malware scanning that are specific to the target computer 500 are obtained. This will typically be done by manual interaction with a user interface of an input device 532 of the target computer 500. For example, the user might be asked to choose which malware removal applications 615 that the Malware Removal Coordinating Program 601 should run. Typically, the user will be presented with a list having all the malware removal applications 615 selected by default, with the opportunity to deselect particular ones. Alternatively, this step might be performed automatically. For example, the Malware Removal Coordinating Program 601 might obtain system-specific information by examining the target computer system 500 itself, and making choices accordingly. In some embodiments of the invention, this step might be skipped entirely.

In step 1040, the software determines whether the malware removal application 615 will be updated, a choice that may have been specified in the previous step.

If malware removal applications 615 will be updated, then, in step 1050, a second decision is made whether the updates will be read from an updates storage device 610 that is separate from the malware removal storage device 605. If so, then in step 1060, they are obtained from this device (e.g., a flash drive 540, as shown in FIG. 5). (Note that in some embodiments of the invention, prior downloading of updates to an updates storage device 610 may be explicitly regarded as a step in the process.) Otherwise, in step 1070, the target computer 500, within the Diagnostic OS 400, is used to download the updates from across a network, such as the World Wide Web. In step 1080, the updates are applied to the malware removal applications 615.

The initialization phase ends 1090. The execution phase is shown in FIG. 11.

Malware Removal Applications Execution Phase

Figure 11:
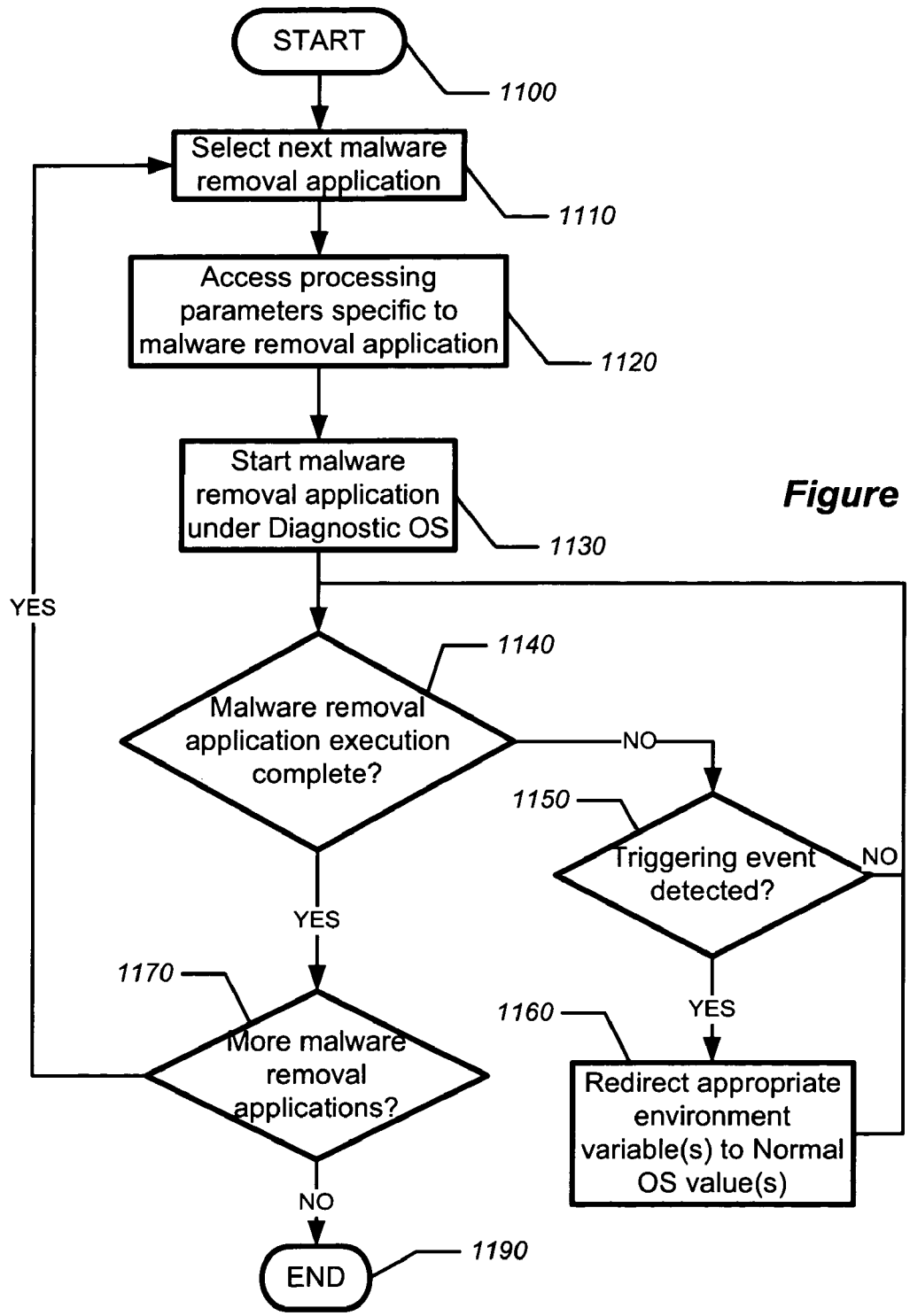
FIG. 11 is a detail flowchart for the execution phase of the malware removal process in an embodiment of the present invention.

FIG. 11 is a flowchart for the phase 1100 in which the malware removal applications 615 are executed. This phase gives example details, for some embodiments of the invention, corresponding to step 920 of FIG. 9. Steps 1110 through 1170 represent the main loop through the individual malware removal applications 615.

In step 1110, the next malware removal application 615 is selected. On the first time through the loop, this will be the first malware removal application 615 to be executed. In step 1120, processing parameters that are specific to a malware removal application 615 are accessed. For example, some such processing parameters might be obtained from the Diagnostic Mapping 603. Others might be system-specific scanning choices specified by a user in step 1030 of FIG. 10. Some of these processing parameters will give specifics regarding redirection requirements.

In step 1140, a determination is made whether the malware removal application 615 is done executing. If not, then, in step 1150, the application watches to see if a triggering event has occurred. In the case of an injection, this might be the lapse of, say, one-half second from the start of program execution. In the case of an interception, the Interceptor 602 may have detected an attempt by the malware removal application 615 to access a particular registry key. When a triggering event does occur, the malware removal application 615 is redirected so that it obtains the value of the variable it would have received if it were executing under the Normal OS 100, rather than the Diagnostic OS 400. Any means or type of redirection previously discussed herein might be used, depending on the situation. Redirection may be performed either by the Malware Removal Coordinating Program 601 directly (e.g., in the case of injection) or by its agent, an Interceptor 602 or driver (e.g., in the case of interception). Injection and interception might be happening in parallel, within different threads or computer processes.

A person of skill in the art will realize that the loop represented by steps 1140 through 1160 need not be implemented exactly as depicted in the figure. Essentially, the logic responds to triggering events, until either no more are expected, or the malware removal application 615 terminates, whichever occurs first. When a triggering event occurs, the malware removal application 615 is redirected accordingly.

Step 1170 checks whether there are more malware removal applications 615 to be executed. If so, the execution phase continues; otherwise, it ends 1190, and the finalization phase begins in FIG. 11.

Finalization Phase

Figure 12:
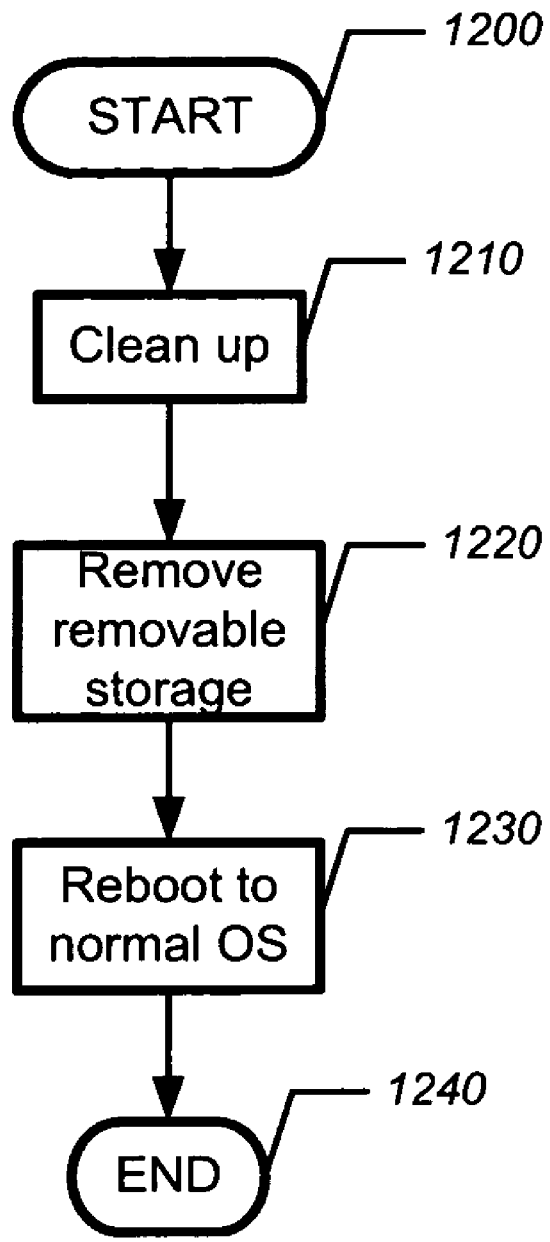
FIG. 12 is a detail flowchart for the finalization phase of the malware removal process in an embodiment of the present invention.

FIG. 12 is a flowchart for the phase 1200 of finalizing the malware removal process. This flowchart gives example details, for some embodiments of the invention, corresponding to step 930 of FIG. 9. In step 1210, various steps to clean up vestiges of the malware removal process may be performed. The idea is to leave the target computer 500 in the state it was found at the start of the malware removal process, but of course infection-free. For example, software, if any, installed on the internal hard drive of the target computer 500 may be removed. This will ordinarily be done automatically by the Malware Removal Coordinating Program 601. Removal of the Diagnostic OS 400 usually occurs automatically as part of the reboot itself, since the Diagnostic OS 400 is typically installed in RAM disk, and RAM disk allocation will, by default, not survive reboot.

In step 1220, any removable storage connected to the computer as part of the malware disinfection process is removed. See, for example, FIGS. 5 and 6. This step will usually involve some manual processing, if only to remove the media from the target computer 500.

In step 1230, the target computer 500 is rebooted back to the Normal OS 100. This step might be caused by manual control, or it might be caused automatically by the Malware Removal Coordinating Program 601. The finalization phase and the overall process end 1240.

CONCLUSION

A practitioner in the art will recognize that many aspects of the Custom Safe Mode 300 described in U.S. application Ser. No. 11/825,168, of which this application is a continuation-in-part, can also be usefully applied to the Diagnostic Mode 405 described herein. Such aspects should be regarded as part of this description as well and incorporated into the present invention. The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for removing malware from a target computer, which normally boots into a normal shell under management of a normal operating system (OS), and provides a normal OS environment in which a plurality of environment variables are arranged in a normal OS arrangement within tangible digital storage, the method comprising:
 a) booting the target computer from tangible digital storage into a diagnostic OS, the diagnostic OS automatically:
   (i) installing in tangible digital storage a diagnostic OS environment, which provides an arrangement of the plurality of environment variables that differs from the normal OS arrangement;
   (ii) initiating, within the diagnostic OS, using instructions stored in tangible digital storage, a malware removal coordinating program causing the target computer to automatically perform the steps of:
     (A) accessing from tangible digital storage a plurality of malware removal applications,
     (B) initiating execution of each of the plurality of malware removal applications, including a given malware removal application that executes variable-accessing logic, the variable-accessing logic relying upon the arrangement of the plurality of environment variables in the normal OS environment, to find the value of a particular environment variable, and (C) redirecting the given malware removal application to a correct value, corresponding to the normal OS environment, of the particular environment variable, without modifying the variable-accessing logic of the given malware removal application, wherein redirecting the given malware removal application occurs upon an attempt by the given malware removal application to access a registry variable; and (iii) rebooting the target computer into the normal shell in the normal OS, wherein an environment variable is a variable that contains operating system configuration information, operating system options, or information related to controlling the behavior of a process.

2. The method of claim 1, the tangible digital storage in the step of booting the target computer being in a removable apparatus.

3. The method of claim 1, further comprising:
(D) obtaining, through a user input device, a choice relating to execution of a malware removal application in the plurality of malware removal applications.

4. The method of claim 1, the malware removal coordinating program further causing the target computer to automatically perform the step of:
(D) updating the malware removal applications.

5. The method of claim 4, wherein the step of updating is performed using updates previously downloaded to tangible digital storage in a removable apparatus.

6. The method of claim 5, wherein the tangible digital storage, from which booting the target computer is done, is contained in a removable apparatus that is distinct from the removable apparatus containing the tangible digital storage to which updates were previously downloaded.

7. The method of claim 6, wherein the apparatus, which contains the tangible digital storage from which booting is done, is read-only by the target computer, and the apparatus, which contains the tangible digital storage to which updates are downloaded, is writable by the target computer.

8. The method of claim 4, wherein the step of updating is performed using updates downloaded to tangible digital storage by the target computer while the target computer is operating under the diagnostic OS.

9. The method of claim 4, wherein the step of updating is performed using updates previously downloaded by a computer, other than the target computer, to tangible digital storage on a removable apparatus.

10. The method of claim 1, wherein the redirecting is delayed, for a previously specified interval of time, after initiating execution of the given malware removal application.

11. The method of claim 1, the malware removal coordinating program further causing the target computer to automatically perform the steps of:
(D) injecting into an environment variable in the diagnostic OS environment a corresponding value from the normal OS environment.

12. The method of claim 11, wherein redirecting the given malware removal application occurs upon observation by the malware removal coordinating program of a triggering pattern of events in information regarding status of the malware removal application after initiation of execution the malware removal application.

13. The method of claim 12, wherein the normal OS environment includes a normal OS registry of settings and options, and the diagnostic OS environment includes a diagnostic OS registry of settings and options.

14. The method of claim 13, wherein a driver intercepts the attempt by the given malware removal application to access a registry variable and causes the redirecting.

15. The method of claim 1, wherein the normal OS environment includes a normal OS registry of settings and options, and the diagnostic OS environment includes a diagnostic OS registry of settings and options, and wherein the redirecting causes the given malware removal application to use the normal OS registry rather than the diagnostic OS registry for any subsequent registry accesses.

16. The method of claim 1, wherein the normal OS environment includes a normal OS registry of settings and options, and the diagnostic OS environment includes a diagnostic OS registry of settings and options, and wherein the redirecting includes modifying the diagnostic OS registry.

17. A computer system, comprising:
a) a processor, random access memory, an input, a display, an optical drive, non-volatile storage, and a peripheral port;
b) a normal operating system (OS) existing as programming and data on the storage, the normal OS including a normal OS environment having a normal OS arrangement in tangible digital storage of a plurality of environment variables;
c) a first removable tangible digital storage, containing:
(i) a plurality of malware removal applications;
(ii) a diagnostic OS existing as programming on the tangible digital storage device in bootable form, configured to:
(A) create a diagnostic OS environment, having a diagnostic OS arrangement in tangible digital storage of the plurality of environment variables, and
(B) initiate execution of a malware removal coordinating program;
(iii) the malware removal coordinating program, being configured to:
(A) update the malware removal applications using the updates from the first removable tangible digital storage device,
(B) initiate execution of each of the plurality of malware removal applications, including a given malware removal application that executes variable-accessing logic, the variable-accessing logic relying upon the normal OS arrangement of environment variables to find the value of a particular environment variable, and
(C) monitor progress of the executing given malware removal application, and
(D) upon observing a triggering event in the monitored progress, redirect the given malware removal application to the correct value, corresponding to the normal OS environment, of the particular environment variable, without modifying the variable-accessing logic of the given malware removal application, wherein an environment variable is a variable that contains operating system configuration information, operating system options, or information related to controlling the behavior of a process.

18. The computer system of claim 17, further comprising:
e) a second removable tangible digital storage device, containing updates for the plurality of malware removal applications, wherein the first removable tangible digital storage device is read-only by the computer system, and the second removable tangible digital storage device is writable by the computer system.

19. A malware removal system, comprising:
a) an updates storage device that is a computer-readable removable storage device, and that contains updates data for a plurality of malware removal applications; and
b) a malware removal storage device that is a computer-readable removable storage device, and that contains:
   (i) a diagnostic OS, in software form, that is bootable from the malware removal storage device and that establishes a diagnostic OS environment when the diagnostic OS is booted,
   (ii) the plurality of malware removal applications, in software form, configured to be updated using the updates data, each malware removal application containing logic relying upon a normal OS environment for successful execution, and
   (iii) a malware removal controller, including:
      (A) a malware removal coordinating program, in software form, configured to selectively direct malware removal applications seeking to access environment variables to a normal OS environment or a diagnostic OS environment, thereby causing the malware removal applications to remove malware when executing under the diagnostic OS, as the malware removal application would when executing under the normal OS,
      (B) a plurality of interceptors, configured to operate under control of the malware removal coordinating program, in software form, each interceptor configured to trap attempts by at least one malware removal application to access environment variables, and determine whether to direct individual attempts to either the normal OS environment or the diagnostic OS environment, wherein directing the at least one malware removal application occurs upon an attempt by the at least one malware removal application to access a registry variable, and
      (C) a diagnostic mapping, that associates each malware removal application with an associated set of execution specifications,
wherein an environment variable is a variable that contains operating system configuration information, operating system options, or information related to controlling the behavior of a process.

20. A method, comprising:
a. executing on a computer, under a first operating system environment, a malware removal application that is configured to execute under a second operating system environment on the computer;
b. during the executing, attempting by the application to access a first location in storage that would hold a correct value of a variable were the application to be executing under the second operating system environment, but that is an inappropriate location to expect the correct value because the application is executing under the first operating system environment; and
c. causing the application to receive the correct value of the variable in response to the attempting, thereby allowing the application to remove malware while executing under the first operating system environment.

21. The method of claim 20, further comprising:
d. setting the content contained by the first location to the correct value.

22. The method of claim 20, wherein the causing step includes redirecting the access to a second location in the computer.

23. The method of claim 20, wherein the step of attempting to access the first location includes attempting to access information from a registry.

24. The method of claim 20, wherein the step of attempting to access the first location includes attempting to access operating system configuration information or an operating system option.

25. The method of claim 20, wherein the step of attempting to access the first location includes attempting to access information in a database.

26. The method of claim 20, wherein the step of attempting to access the first location includes attempting to access an environment variable.

27. An apparatus, comprising:
a. a digital computer that executes, under a first operating system environment, a malware removal application which is configured to execute under a second operating system environment on the computer; and
b. logic, executing on a processor of the computer, that
   (i) observes the application, while executing under the second OS environment, attempting to access a first location in storage that would hold a correct value of a variable were the application to be executing under the second operating system environment, but that would be an inappropriate location to expect the correct value because the malware removal application is executing under the first operating system environment; and,
   (ii) causes the application to receive the correct value of the variable in response to the attempting, thereby allowing the application to remove malware while executing under the first operating system environment.

28. The apparatus of claim 27, wherein the logic changes the content contained by the first location from the first content to the second content.

29. The apparatus of claim 27, wherein the logic redirects the access to a second location in the computer.

30. The apparatus of claim 27, wherein, when the application attempts to access the first location, the application is attempting to access operating system configuration information or an operating system option.

31. The apparatus of claim 27, wherein, when the application attempts to access the first location, the application is attempting to access information in a database.

32. The apparatus of claim 27, wherein, when the application attempts to access the first location, the application is attempting to access an environment variable.

33. The apparatus of claim 27, further comprising:
c. a tangible digital storage device, the logic including instructions that are stored on the storage device.

34. An apparatus, comprising a storage device or memory device, the device including software instructions that contain logic such that when:
a. the logic is executing on a computer under a first operating system environment;
b. a malware removal application, which is configured to execute under a second operating system environment, is also executing on the computer, under the first operating system environment; and c. the application attempts to access a first location in storage that would hold a correct value of a variable were the application to be executing under the second operating system environment, but that would be an inappropriate location to expect the correct value because the malware removal application is executing under the first operating system environment;

then the logic causes the application to receive, as a result of attempting to access the first location, the correct value of the variable, thereby allowing the application to remove malware while executing under the first operating system environment.

* * * * *

UNITED STATES PATENT AND TRADEMARK OFFICE
CERTIFICATE OF CORRECTION

| | | |
|---|---|---|
| PATENT NO. | : 8,234,710 B2 | Page 1 of 1 |
| APPLICATION NO. | : 12/380681 | |
| DATED | : July 31, 2012 | |
| INVENTOR(S) | : Michael Wenzinger and Michael Sherwood | |

It is certified that error appears in the above-identified patent and that said Letters Patent is hereby corrected as shown below:

On the Title Page:
Item (73) (Assignee):
Delete "BB4" and insert --BBY--

Signed and Sealed this
First Day of January, 2013

David J. Kappos
*Director of the United States Patent and Trademark Office*